United States Patent Office 3,351,436
Patented Nov. 7, 1967

3,351,436
PREPARATION OF THORIUM PYROPHOSPHATE
James F. Sarver, Cleveland, Ohio, assignor to General Electric Company, a corporation of New York
No Drawing. Filed Dec. 28, 1964, Ser. No. 421,587
6 Claims. (Cl. 23—345)

This invention relates to a method of preparation of thorium pyrophosphate, and has for one of its objects the preparation of a material which is particularly useful as a starting material or intermediate in the preparation of fluorescent materials or phosphors. It is a further object to provide a method of quantitatively precipitating thorium phosphate by a method which avoids the formation of unmanageable gels.

Thorium pyrophosphate is useful for the production of phosphors such as, for example, a known thorium copper phosphate, as in Patent 3,049,497 to Ranby et al., for example. A known process for the synthesis of such a phosphor involves the use of ammonium phosphate as a source of $P_2O_5$. This is mixed with thorium oxide and copper oxide and fired at a relatively low temperature to decompose the ammonium phosphate and initiate solid state reactions. This low temperature decomposition is necessary since ammonium phosphate tends to volatilize at higher temperatures before reacting with other oxide constituents, whereas thorium pyrophosphate is quite stable at elevated temperatures.

It will be evident that it is highly desirable to have available a thorium phosphate compound such as thorium pyrophosphate, $ThP_2O_7$, as a stable source of $P_2O_5$, eliminating the need for low temperature calcination.

Thorium phosphate is not available commercially and it is necessary to precipitate thorium phosphate (hydrate). Precipitation of thorium phosphate from aqueous solutions of materials such as thorium nitrate and phosphoric acid is very troublesome in that unless the solutions are very dilute, gels are formed. On the other hand, if the solutions are very dilute, the yield efficiency of thorium phosphate is quite low, in the sense of requiring unduly large amounts of water. Control of stoichiometry is also a problem in precipitation from aqueous solutions.

Therefore, in accordance with the invention, I have found that alcohols in which thorium nitrate is soluble such as ethyl alcohol, but preferably methyl alcohol, a relatively inexpensive reagent, is far superior to water as a precipitation medium. Unmanageable gels are avoided even in relatively concentrated solutions, and stoichiometry is quite precise.

By way of specific example, hydrated thorium nitrate, $Th(NO_3)_4 \cdot 4H_2O$, phosphoric acid (85.8% $H_3PO_4$), and methyl alcohol are used as starting materials. A quantity of 110.44 grams of thorium nitrate is dissolved in 400 cc. of alcohol. An alcohol solution of phosphoric acid is prepared by mixing 45.69 grams of phosphoric acid in 200 cc. of alcohol. The thorium nitrate solution is stirred with a magnetic stirrer while the alcohol-phosphoric acid solution is added to it. The precipitate forms over a period of a few minutes rather than immediately. The same procedure using similar amounts of water yields an unmanageable gel.

The amorphous thorium phosphate precipitate thus formed may be recovered, dried, and use as such in the preparation of a phosphor. However, a crystalline product is formed by firing at a suitable time and temperature if desired.

Accordingly, in accordance with one procedure, the thorium phosphate percipitate, prepared as described above, is filtered from the supernatant liquid, dried at 110° C., and fired directly at 1100° C. for two hours in vitreous silica crucibles in air. The weight of the fired material corresponds to the expected amount of $ThP_2O_7$, and an X-ray pattern of the fired material showed the presence of only $ThP_2O_7$.

In accordance with another procedure, the precipitate and solution are dried on a steam bath and the solid material corresponds to the expected amount of $ThP_2O_7$, and hours, yielding $ThP_2O_7$.

The original precipitate was amorphous to X-rays, even though it did not exhibit gel properties.

The fired material is easily crushed and is a desirable material as a source of $P_2O_5$ in the preparation of fluorescent materials.

It will be evident to those skilled in the art that various substitutions and modifications may be made within the spirit of the invention for materials, temperatures and times specifically recited herein.

What I claim as new and desire to secure by Letters Patent of the United States is:

1. The method if preparing thorium pyrophosphate which comprises mixing stoichiometric quantities of methyl alcohol solutions of thorium nitrate and phosphoric acid, and recovering the resulting thorium pyrophosphate precipitate.

2. The method of preparing thorium pyrophosphate which comprises mixing stoichiometric quantities of methyl alcohol solutions of thorium nitrate and phosphoric acid, recovering the resulting thorium pyrophosphate precipitate, and firing the precipitate at a temperature and for a time sufficient to form crystalline thorium pyrophosphate.

3. The method of preparing thorium pyrophosphate which comprises mixing stoichiometric quantities of methy alcohol solutions of thorium nitrate and phosphoric acid, recovering the resulting thorium pyrophosphate precipitate, and firing the precipitate at about 1100° C. for about two hours to form crystalline thorium pyrophosphate.

4. The method of preparing thorium pyrophosphate which comprises mixing together, in proportions corresponding to the following stated amounts, 110.44 grams of $Th(NO_3)_4 \cdot 4H_2O$ dissolved in 400 cc. of methyl alcohol with 45.69 grams of 85.8% $H_3PO_4$ in 200 cc. of methyl alcohol, and recovering the resulting thorium pyrophosphate precipitate.

5. The method of preparing thorium pyrophosphate with comprises mixing together, in proportions corresponding to the following stated amounts, 110.44 grams of $Th(NO_3)_4 \cdot 4H_2O$ dissolved in 400 cc. of methyl alcohol with 45.69 grams of 85.8% $H_3PO_4$ in 200 cc. of methyl alcohol, recovering the resulting thorium pyrophosphate precipitate, and firing the precipitate at a temperature and for a time sufficient to form crystalline thorium pyrophosphate.

6. The method of preparing thorium pyrophosphate which comprises mixing together, in proportions corresponding to the following stated amounts, 110.44 grams of $Th(NO_3)_4 \cdot 4H_2O$ dissolved in 400 cc. of methyl alcohol with 45.69 grams of 85.8% $H_3PO_4$ in 200 cc. of methyl alcohol, recovering the resulting thorium pyrophosphate precipitate, and firing the precipitate at about 1100° C. for about two hours to form crystalline thorium pyrophosphate.

No references cited.

CARL D. QUARFORTH, *Primary Examiner.*

S. TRAUB, R. L. GRUDZIECKI, *Assistant Examiners.*